(12) United States Patent
Yiu (10) Patent No.: US 8,923,880 B2
(45) Date of Patent: Dec. 30, 2014

(54) SELECTIVE JOINDER OF USER EQUIPMENT WITH WIRELESS CELL

(71) Applicant: Intel Corporation, Santa Clara, CA (US)

(72) Inventor: Candy Yiu, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 121 days.

(21) Appl. No.: 13/802,491

(22) Filed: Mar. 13, 2013

(65) Prior Publication Data

US 2014/0094185 A1 Apr. 3, 2014

Related U.S. Application Data

(60) Provisional application No. 61/707,784, filed on Sep. 28, 2012.

(51) Int. Cl.
*H04W 72/00* (2009.01)
*H04L 29/06* (2006.01)
(Continued)

(52) U.S. Cl.
CPC .............. *H04L 65/602* (2013.01); *H04L 65/60* (2013.01); *H04W 72/0486* (2013.01); *H04W 72/042* (2013.01); *H04W 28/08* (2013.01); *H04W 48/20* (2013.01); *H04W 36/22* (2013.01); *H04J 3/1694* (2013.01); *H04W 72/02* (2013.01); *H04W 24/10* (2013.01); *H04W 48/16* (2013.01); *H04W 76/025* (2013.01); *H04W 52/0212* (2013.01); *H04W 24/08* (2013.01); *H04W 40/246* (2013.01); *H04L 67/10* (2013.01); *H04B 5/00* (2013.01); *H04W 72/0406* (2013.01); *H04L 5/0073* (2013.01); *H04W 52/0261* (2013.01); *H04W 36/08* (2013.01); *Y02B 60/50* (2013.01)
USPC ............ 455/453; 455/450; 455/512; 455/513

(58) Field of Classification Search
CPC ..... H04W 28/08; H04W 24/05; H04W 24/10; H04W 72/08; H04W 72/085; H04W 72/087; H04W 72/10; H04L 65/602; H04L 65/60
USPC .................................. 455/453, 450, 512, 513
See application file for complete search history.

(56) References Cited

U.S. PATENT DOCUMENTS

2014/0235271 A1* 8/2014 Jung et al. ................... 455/456.1
2014/0247810 A1* 9/2014 Bontu et al. .................. 370/332
2014/0248842 A1* 9/2014 Yi et al. ..................... 455/67.11

FOREIGN PATENT DOCUMENTS

WO 2010-085264 A1 7/2010

OTHER PUBLICATIONS

Jeremy K. Chen et al., "Iterative Water-filling for Load-balancing in Wireless LAN or Microcellular Networks," 2006, IEEE, 6 pages.

(Continued)

*Primary Examiner* — Khai M Nguyen
(74) *Attorney, Agent, or Firm* — Schwabe, Williamson & Wyatt, P.C.

(57) ABSTRACT

Embodiments are described herein for selective joinder, by a user equipment ("UE"), to a wireless cell of a plurality of wireless cells. In various embodiments, this may include transitioning, by the UE, from an idle mode to a connected mode, and contemporaneously with the transition of the UE from the idle mode to the connected mode, measuring, by the UE, signals of a first plurality of cells. In various embodiments, the UE may identify, from within the first plurality of cells, a second plurality of cells having measured signals that satisfy a channel condition criterion and frequency priorities that satisfy a priority criterion. In various embodiments, the UE may be configured to select and join a cell of the second plurality of cells, randomly or based on respective loads of the second plurality of cells.

21 Claims, 5 Drawing Sheets

(51) Int. Cl.
| | |
|---|---|
| *H04W 72/04* | (2009.01) |
| *H04W 28/08* | (2009.01) |
| *H04W 48/20* | (2009.01) |
| *H04W 36/22* | (2009.01) |
| *H04J 3/16* | (2006.01) |
| *H04W 72/02* | (2009.01) |
| *H04W 24/10* | (2009.01) |
| *H04W 48/16* | (2009.01) |
| *H04W 76/02* | (2009.01) |
| *H04W 52/02* | (2009.01) |
| *H04W 24/08* | (2009.01) |
| *H04W 40/24* | (2009.01) |
| *H04L 29/08* | (2006.01) |
| *H04B 5/00* | (2006.01) |
| *H04L 5/00* | (2006.01) |
| *H04W 36/08* | (2009.01) |

(56) References Cited

OTHER PUBLICATIONS

International Search Report and Written Opinion for International Application No. PCT/US2013/059780, mailed Dec. 2, 2013.

\* cited by examiner

SELECTIVE JOINDER OF USER EQUIPMENT WITH WIRELESS CELL

CROSS REFERENCE TO RELATED APPLICATIONS

This application claims priority under 35 U.S.C. §119(e) to U.S. Provisional Patent Application No. 61/707,784 entitled "ADVANCED WIRELESS COMMUNICATION SYSTEMS AND TECHNIQUES," filed Sep. 28, 2012, the disclosure of which is incorporated herein by reference.

FIELD

Embodiments of the present invention relate generally to the technical field of data processing, and more particularly, to selective joinder of wireless cells by user equipment.

BACKGROUND

The background description provided herein is for the purpose of generally presenting the context of the disclosure. Work of the presently named inventor, to the extent it is described in this background section, as well as aspects of the description that may not otherwise qualify as prior art at the time of filing, are neither expressly nor impliedly admitted as prior art against the present disclosure. Unless otherwise indicated herein, the approaches described in this section are not prior art to the claims in the present disclosure and are not admitted to be prior art by inclusion in this section.

When user equipment ("UE") transitions from an idle mode to a connected mode, such as from RRC_IDLE to RRC_CONNECTED pursuant to the 3GPP Long Term Evolution ("LTE") Release 10 (March 2011) (the "LTE Standard") and beyond, the UE may select and join one of a plurality of detected cells based on frequency priorities associated with the cells. For instance, the LTE standard dictates that the UE may select and join the cell in the highest priority frequency. When two detected cells are in the highest priority frequency, the LTE standard dictates that the UE select and join the cell having the best channel condition (e.g., as indicated by $Srxlev_{nonServingCell,x}$). However, when a large number of UEs at or near a particular geographic location transition from idle to connected contemporaneously (e.g., after an event such as a movie or play), those UEs may all join the same cell. In such case, that cell may become overloaded.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrases "A or B" and "A and/or B" mean (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the terms "module" and/or "logic" may refer to, be part of, or include an Application Specific Integrated Circuit ("ASIC"), an electronic circuit, a processor (shared, dedicated, or group) and/or memory (shared, dedicated, or group) that execute one or more software or firmware programs, a combinational logic circuit, and/or other suitable components that provide the described functionality.

As used herein, a "channel condition" may refer to a Reference Signal Received Power ("RSRP") from a base station (e.g., an evolved Node B, or "eNB"), an amount of interference from other base stations, etc. In some embodiments, a channel condition may be indicated by $Srxlev_{nonServingCell,x}$, as set forth in Technical Specification 25.304, section 5.2.6.1.4a.

Although examples described herein reference user equipment ("UE") and other terminology generally associated with the 3GPP Long Term Evolution ("LTE") Release 10 (March 2011) (the "LTE Standard"), this is not meant to be limiting. Techniques described herein may be application with numerous wireless network technologies, such as IEEE 502.20, General Packet Radio Service ("GPRS"), Evolution Data Optimized ("Ev-DO"), Evolved High Speed Packet Access ("HSPA+"), Evolved High Speed Downlink Packet Access ("HSDPA+"), Evolved High Speed Uplink Packet Access ("HSUPA+"), Global System for Mobile Communications ("GSM"), Enhanced Data rates for GSM Evolution ("EDGE"), Code Division Multiple Access ("CDMA"), Time Division Multiple Access ("TDMA"), Digital Enhanced Cordless Telecommunications ("DECT"), Bluetooth, derivatives thereof, as well as any other wireless protocols that are designated as 3G, 4G, 5G, and beyond.

Figure 1:
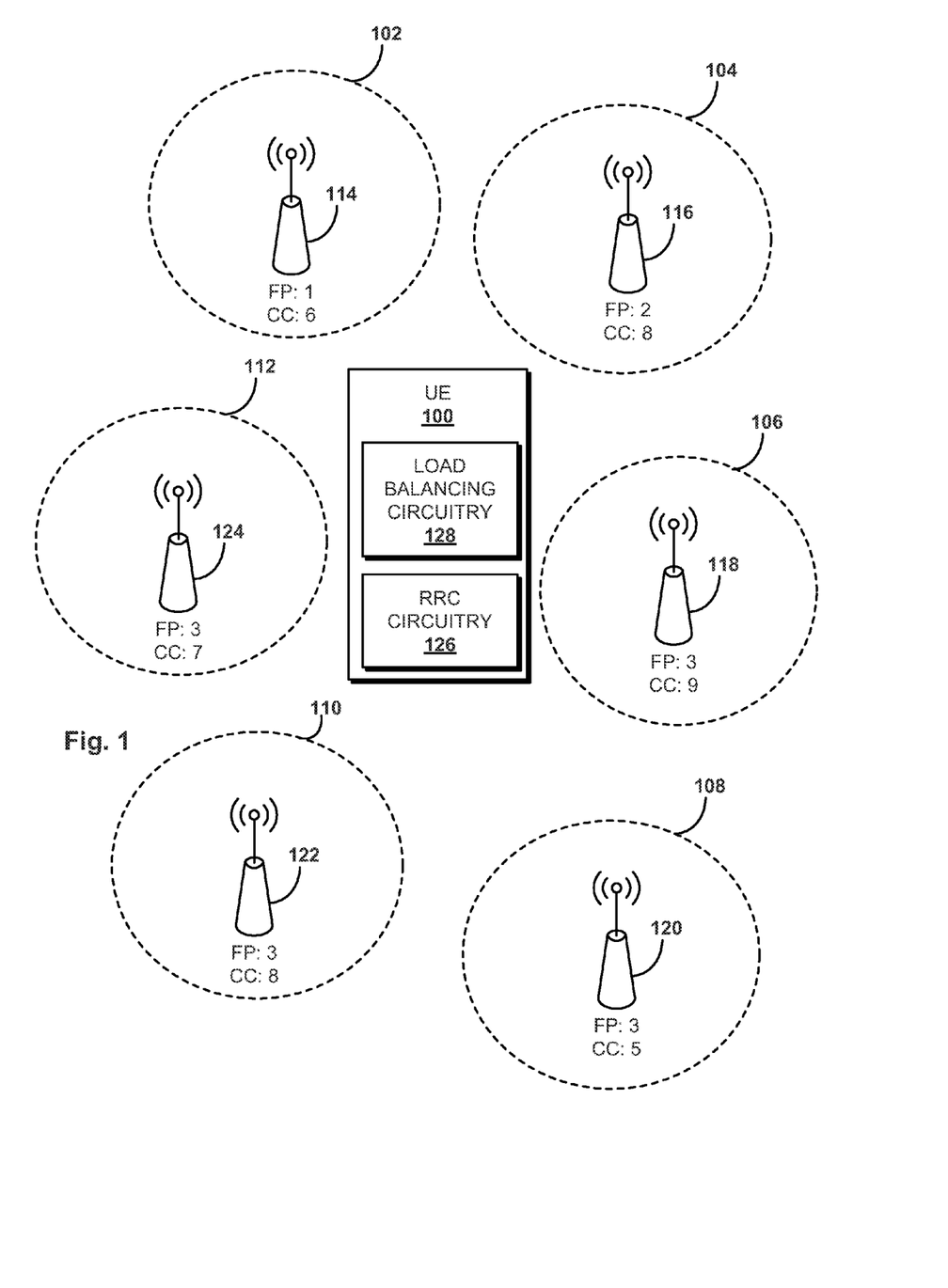
FIG. 1 schematically illustrates various network entities configured with applicable portions of the present disclosure to facilitate selective joinder by user equipment ("UE") with wireless cells, in accordance with various embodiments of the present disclosure.

Components that may facilitate selective joinder of wireless cells by a UE 100 are shown in FIG. 1, in accordance with various embodiments. UE 100 may be configured to detect a plurality of wireless cells, such as first through sixth wireless cells 102-112. First through sixth cells 102-112 may be provided by first through sixth eNBs 114-124, respectively. While six wireless cells are detected in the example in FIG. 1, more or less wireless cells may be detected depending on the location of UE 100. For example, in a metropolitan area, UE 100 will likely detect more wireless cells than in a rural area.

In various embodiments, UE 100 may be configured with radio resource control ("RRC") circuitry 126. In various embodiments, RRC circuitry 126 may be configured to transition UE 100 between an RRC idle mode (e.g., RRC IDLE) and an RRC connected mode (e.g., RRC CONNECTED). For example, if UE 100 goes unused for a predetermined amount of time, RRC circuitry 126 may be configured to transition UE 100 to RRC idle mode, e.g., to save battery power. Likewise, if UE 100 is in RRC idle mode and a user (not shown) wishes to use UE 100 (e.g., to make a call), RRC circuitry 126 may be configured to transition UE 100 to RRC connected mode. In various embodiments, RRC circuitry 126 may be implemented with any combination of hardware and software.

On transition from RRC idle to RRC connected, UE 100 may be configured to detect a plurality of cells, e.g., 102-112, and may select a cell of the plurality of detected cells to join. As described in the background, existing techniques, such as those described in the LTE standard, may result in numerous UEs all selecting and joining the wireless cell with a highest absolute priority and the best channel condition. For example, after an event such as a movie, numerous patrons may activate their cells phones virtually simultaneously, e.g., to arrange for a taxi or to make other plans. If those UEs are camped on the same wireless cell, they may all receive, from the serving cell, the same frequency priorities. This may result in the wireless cell in the area having the highest priority frequency and best channel condition becoming overloaded.

Accordingly, in various embodiments, UEs, eNBs and/or other network components may be configured to facilitate selective joinder of UEs to wireless networks based on more than frequency priority and channel condition. To this end, UE 100 may be equipped with load balancing circuitry 128 configured to measure signals of a first plurality of cells, such as detected cells 102-112, contemporaneously with a transition of the UE from the RRC idle mode to the RRC connected mode. As used herein, "contemporaneously" is not limited to simultaneously. Rather, "contemporaneously may include during the same period of time, e.g., as part of a predefined and/or atomic sequence of operations.

Load balancing circuitry 128 may be further configured to select and join one of the detected plurality of cells in a manner that, when replicated across multiple UEs, reduces a likelihood that numerous UEs in a particular area will all join the same wireless cell at or near the same time. In various embodiments, load balancing circuitry 128 may be implemented with any combination of hardware and software.

Assume the cells 102-112 have the following priorities and channel conditions (which are for example only and are not meant to be limiting in any way). In various embodiments, the frequency priorities may have been received from a wireless cell on which UE 102 is camped, which may be the wireless cell that last served UE 100. First cell 102 may have a frequency with a priority ("FP" in FIG. 1) of one and a channel condition (denoted "CC" in FIG. 1) of six. Second cell 104 may have a frequency with a priority of two and a channel condition of eight. Third cell 106 may have a frequency with a priority of three and a channel condition of nine. Fourth cell 108 may have a frequency with a priority of three and a channel condition of five. Fifth cell 110 may have a frequency with a priority of three and a channel condition of eight. Sixth cell 112 may have a frequency with a priority of three and a channel condition of seven. These frequency priority and channel condition quantifications are selected arbitrarily and intended for illustrative purposes only. It should be understood that a frequency priority and channel condition may be quantified in any manner.

If, on transition from idle to connected, UE 100 simply selected the wireless cell with the highest frequency priority and the best channel condition, the UE 100 would select third wireless cell 106. Third wireless cell 106 has a frequency priority that is greater than or equal to frequency priorities of the other detected cells, and the "best" channel condition of nine. However, if other UEs in the area (not shown) transitioned from an idle mode to a connected mode at the same time, they might also all select third wireless cell 106. This may result in third wireless cell 106 becoming overloaded.

Accordingly, in various embodiments, load balancing circuitry 128 may be configured to identify, from within the plurality of detected cells 102-112, a second plurality of cells having measured signals that satisfy a channel condition criterion and frequency priorities that satisfy a priority criterion. Load balancing circuitry 128 may be configured to then select and join a cell of the second plurality of cells, e.g., randomly or based on respective loads of the second plurality of wireless cells. In various embodiments, channel condition criteria and priority criteria may be configured in UE 102 at the manufacturer or later, and in various embodiments may or may not be adjustable, e.g., by a user or automatically in response to an instruction received from the network.

In various embodiments, a priority criterion may be a minimum threshold frequency priority that a detected cell must have in order to be considered by UE 100 as a candidate wireless cell to join. In some embodiments, wireless cells having a highest possible frequency priority, or a frequency priority that is greater than or equal to frequency priorities of all other detected cells, may satisfy the priority condition. In some embodiments, wireless cells having frequency priorities equal to or greater than a particular threshold frequency priority may satisfy the priority condition. In various embodiments, a channel condition criterion may be a minimum threshold channel condition. Any detected wireless cells having a channel condition greater than (or in some cases, equal to) the minimum threshold channel condition may satisfy the channel condition criterion.

Figure 2:
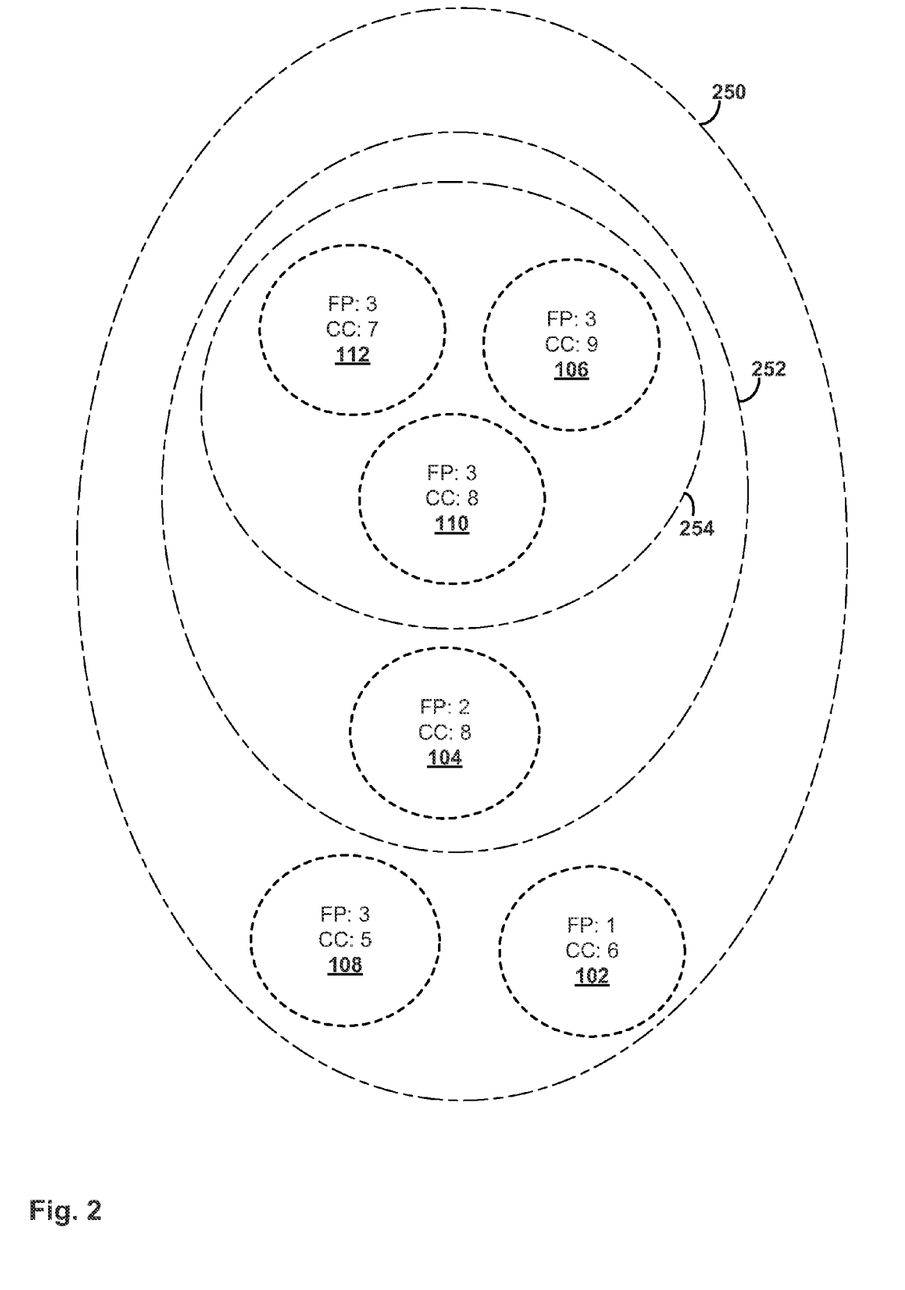
FIG. 2 depicts a diagram showing various subsets of a plurality of detected wireless cells that a UE may identify when transitioning from an idle mode to a connected mode, in accordance with various embodiments.

Suppose UE 100 is configured with a channel condition priority that only cells with a channel condition of at least two will be considered, and a priority criterion that only cells with a frequency priority of at least seven will be considered. An example of this is seen in FIG. 2, which includes the same components described in FIG. 1. All the detected cells 102-112 together may comprise a first plurality of cells 250. In various embodiments, load balancing circuitry 128 may identify, from first plurality of cells 250, a second plurality of wireless cells 252 (also referred to as "candidate" wireless cells). Second plurality of cells 252 may include wireless cells that satisfy both the priority and channel condition criteria. In this example, second plurality of cells 252 may include those cells that satisfy the channel condition and priority criteria of UE 100: CC≥7 and frequency priority≥2; namely, second cell 104, third cell 106, fifth cell 110 and sixth cell 112.

Any wireless cell selected for inclusion in second plurality of wireless cells 252 likely may be sufficient for network communication. Accordingly, rather than simply selecting the cell with an highest frequency priority and best channel condition, which may result in the cell with the best channel condition being overloaded, UE 100 may selectively join a wireless cell of the second plurality of wireless cells 252, e.g., randomly or based on respective loads of wireless cells of second plurality of cells 252. In the latter case, one or more eNBs 114-124 may be configured to make an indication of its current load available to UEs, e.g., as part of its system information or as part of broadcast load balancing data described below.

In some embodiments, load balancing circuitry 128 may be configured to randomly select a cell of the second plurality of cells 252 to join. If multiple UEs in the same area are similarly configured, then the chance of all the UEs selecting the same wireless cell may be less than if the UEs all selected the wireless cell with the best channel condition.

In various embodiments, load balancing circuitry 128 may be configured to select the wireless cell that will be joined by UE 100 from the second plurality of cells based on information received via network signaling. For example, one or more of eNBs 114-124 may be configured to broadcast, e.g., using RRC signaling or non-access stratum ("NAS") signaling, load balancing data that includes frequency priorities, a load indication, and/or an instruction configured to cause UE 100 to select a wireless cell for joinder in a particular manner.

Load balancing circuitry 128 of UE 100 may be configured to select and join a wireless cell from the second plurality of cells 252 based on one or more pieces of the received load balancing data. For example, load balancing circuitry may compare load indications received from each eNB providing a wireless cell of the second plurality of wireless cells 252 to load indications received from others. For example, if a load indication received from third eNB 118 suggests that third cell 106 is overloaded, load balancing circuitry 128 may select another wireless cell with a lighter load, such as fifth wireless cell 110 or sixth wireless cell 112, to join.

In some embodiments, load balancing circuitry 128 may be configured to identify a third plurality of cells 254. For example, in some embodiments, UE 100 may receive, e.g., from an eNB or another network component as part of the aforementioned load balancing data, a positive integer m. Load balancing circuitry 128 may be configured to identify, from within second plurality of wireless cells 252, m wireless cells satisfying some criterion.

For example, in FIG. 2, m=3. Third plurality of cells 254 may include m=3 wireless cells of the second plurality 352 that have, e.g., the highest frequency priorities, best channel conditions, and/or the lightest loads. In this example, second cell 104 has a lower frequency priority than third cell 106, fifth cell 110 and sixth cell 112, and thus is not included in third plurality of m wireless cells 254. In various embodiments, UE 102 may randomly join one of the m cells of third plurality 254.

As another example, the load balancing data may include an instruction configured to cause load balancing circuitry 128 of UE 100 to identify, as third plurality of wireless cells 254, wireless cells within second plurality 252 that have signal qualities that satisfy a particular threshold. For example, the wireless cell of second plurality of wireless cells 252 considered to have the "best" signal quality may be the wireless cell with the maximum RSRP (e.g., $RSRP_{max}$) Third plurality of wireless cells 254 may include wireless cells, where $RSRP_{max} - RSRP_i <$ the received signal quality threshold. In such case, load balancing circuitry 128 may randomly select and join one of third plurality of cells 254.

In some embodiments, load balancing circuitry 128 may be configured to preserve wireless cell frequency priorities received during previous session, and selectively join a wireless cell of second plurality 252 based on those preserved frequency priorities. For example, prior art UEs may save frequency priorities received via dedicated signaling (e.g., during an RRC Connection Release) only until expiration of a validity time of the dedicated priorities, e.g., as measured by a T320 timer in E-UTRA, T322 in UTRA, T3230 in GSM EDGE Radio Access Network ("GERAN"). In contrast, embodiments of UE 100 described herein may be configured save those frequency priorities past expiration of such timers.

When UE 100 as described herein subsequently transitions from idle mode to connected mode, load balancing circuitry 128 may be configured to selectively join one of second plurality of cells 252 based on the saved dedicated frequency priorities. For example, if a frequency of one or more of second plurality of cells 252 was included in the most recent dedicated signaling (e.g., during an RRC Connection Release), UE 100 may select from those one or more cells, e.g., based on load, channel condition or randomly. Otherwise, if second plurality of wireless cells 252 does not include a wireless cell having a frequency contained in the most recent dedicated signaling, UE may selectively join one of second plurality of cells 252 using other techniques described herein (e.g., randomly and/or based on load).

Figure 3:
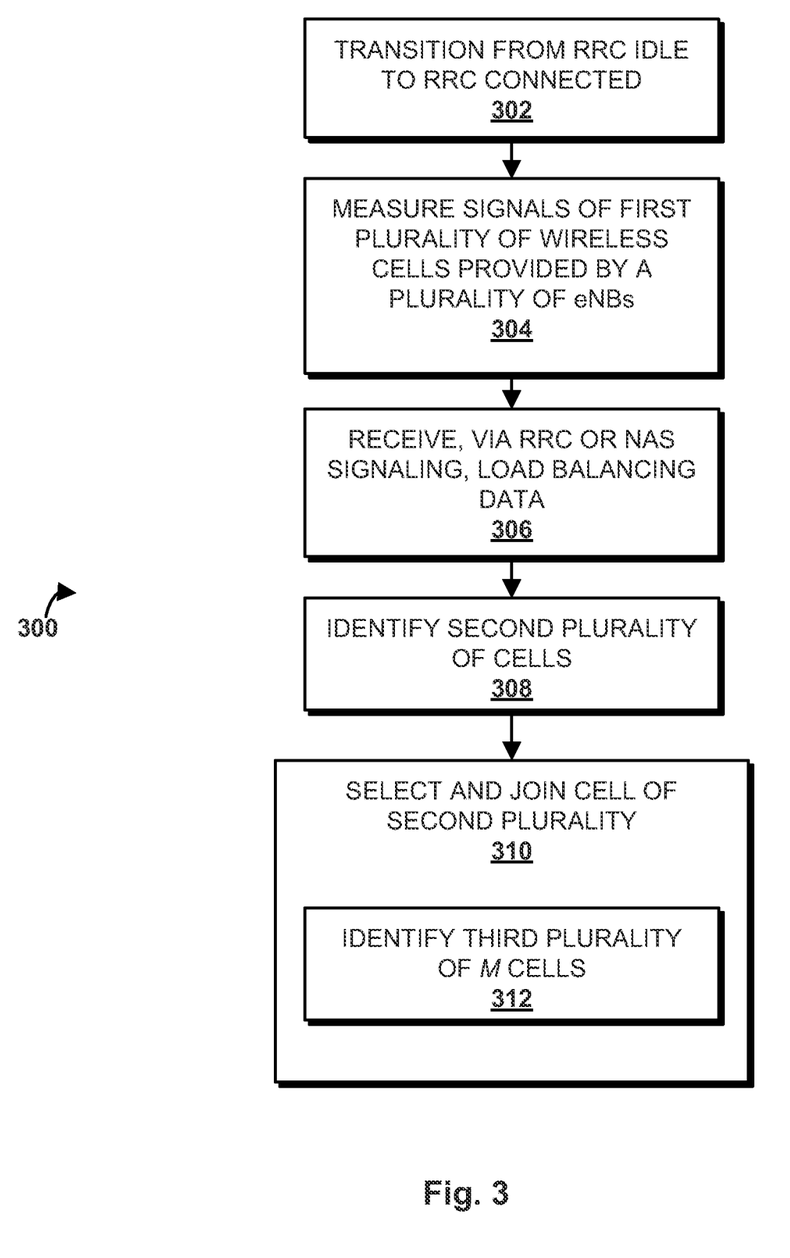
FIG. 3 depicts an example method that may be implemented by a UE, in accordance with various embodiments.

Referring now to FIG. 3, an example method 300 is depicted that may be implemented by a UE such as UE 100 in FIG. 1, in accordance with various embodiments. At block 302, the UE may transition from an RRC idle mode to an RRC connected mode. At block 304, the UE may measure signals of a first plurality of cells (e.g., 250 in FIG. 2) contemporaneously with the transition of the UE from the idle mode to the connected mode. For example, the UE may take measurements of channel conditions for each detected cell.

At block 306, the UE may receive, via RRC or non-access stratum NAS signaling, load balancing data. As noted above, the load balancing data may include a load of a cell, priorities associated with various frequencies, a positive integer m, one or more instructions as to how the UE should select (e.g., randomly, based on load, from a third plurality of m wireless cells, etc.) a cell to join from a second plurality (e.g., 252 in FIG. 2), and so forth. At block 308, the UE may identify, from within the first plurality of cells 250, a second plurality of cells (e.g., 252 in FIG. 2) having measured signals that satisfy a channel condition criterion and frequency priorities that satisfy a priority criterion.

At block 310, the UE may select and join one of the second plurality of cells 252, randomly, based on respective loads of the second plurality of cells 252, and/or based on saved frequency priorities received by UE 100 via dedicated signaling during a prior RRC Connection Release. In some embodiments, at block 312, the UE may identify, from within second plurality of cells 252, a third plurality of m wireless cells 254 that have the m best channel conditions, m lightest loads, etc., and then may randomly select, from the m selected wireless cells, a wireless cell to join.

Figure 4:
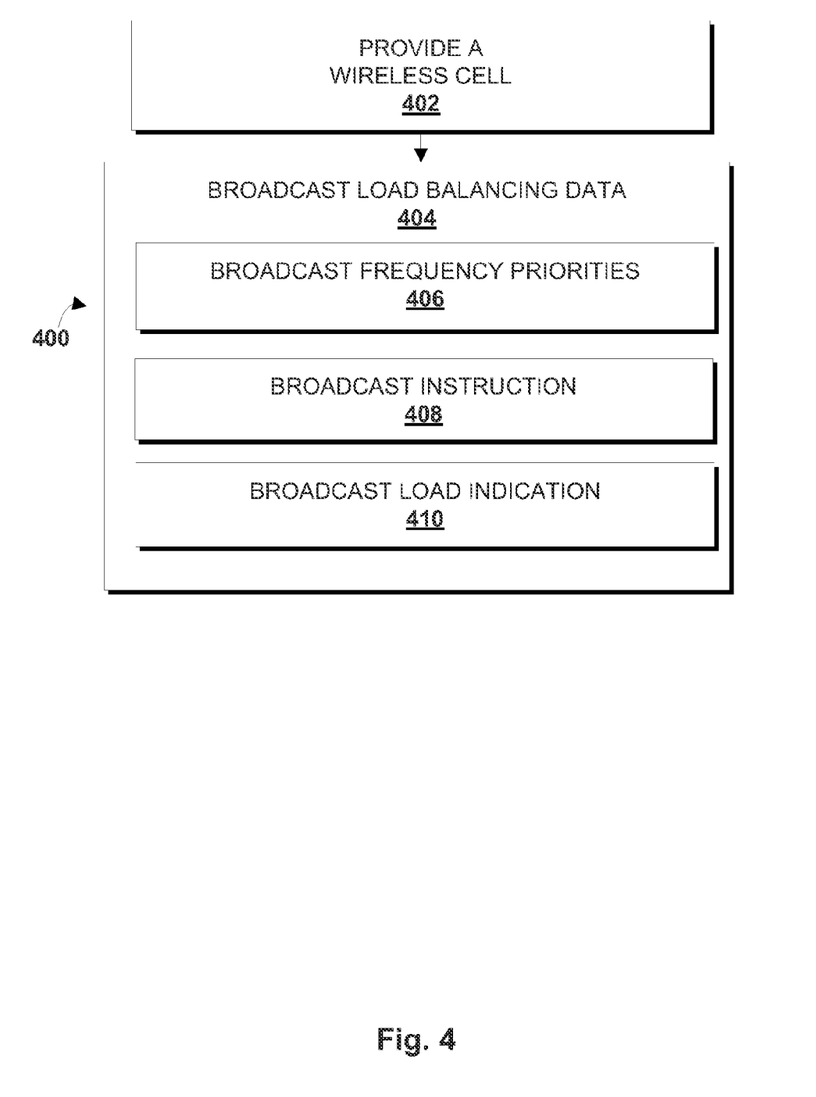
FIG. 4 depicts an example method that may be implemented by an evolved Node B ("eNB"), in accordance with various embodiments.

Referring now to FIG. 4, an example method 400 is depicted that may be implemented by an eNB (e.g., 114-124), in accordance with various embodiments. Similar to UE 100, in various embodiments, an eNB also may include load balancing circuitry (see FIG. 5), which may be configured to perform selected aspects of method 400. At block 402, the eNB may provide a wireless cell, such as one of the wireless cells 102-112 depicted in FIG. 1. At block 404, the eNB may broadcast load balancing data.

For example, at block 406, the eNB may broadcast frequency priorities. Additionally or alternatively, at block 408, the eNB may broadcast an instruction configured to cause a UE to select and join wireless cells of a second plurality of cells (e.g., 252 in FIG. 2) in a particular manner (e.g., randomly, lowest load, randomly from m wireless cells having m lowest loads or m best channel conditions).

In various embodiments, at block 410, the eNB may broadcast an indication of a load of its wireless cell. In some embodiments, the eNB may be configured to obtain one or more load indications from one or more neighboring wireless cells. In such case, the eNB may be configured to broadcast those neighbor load indications at block 410 as well.

Figure 5:
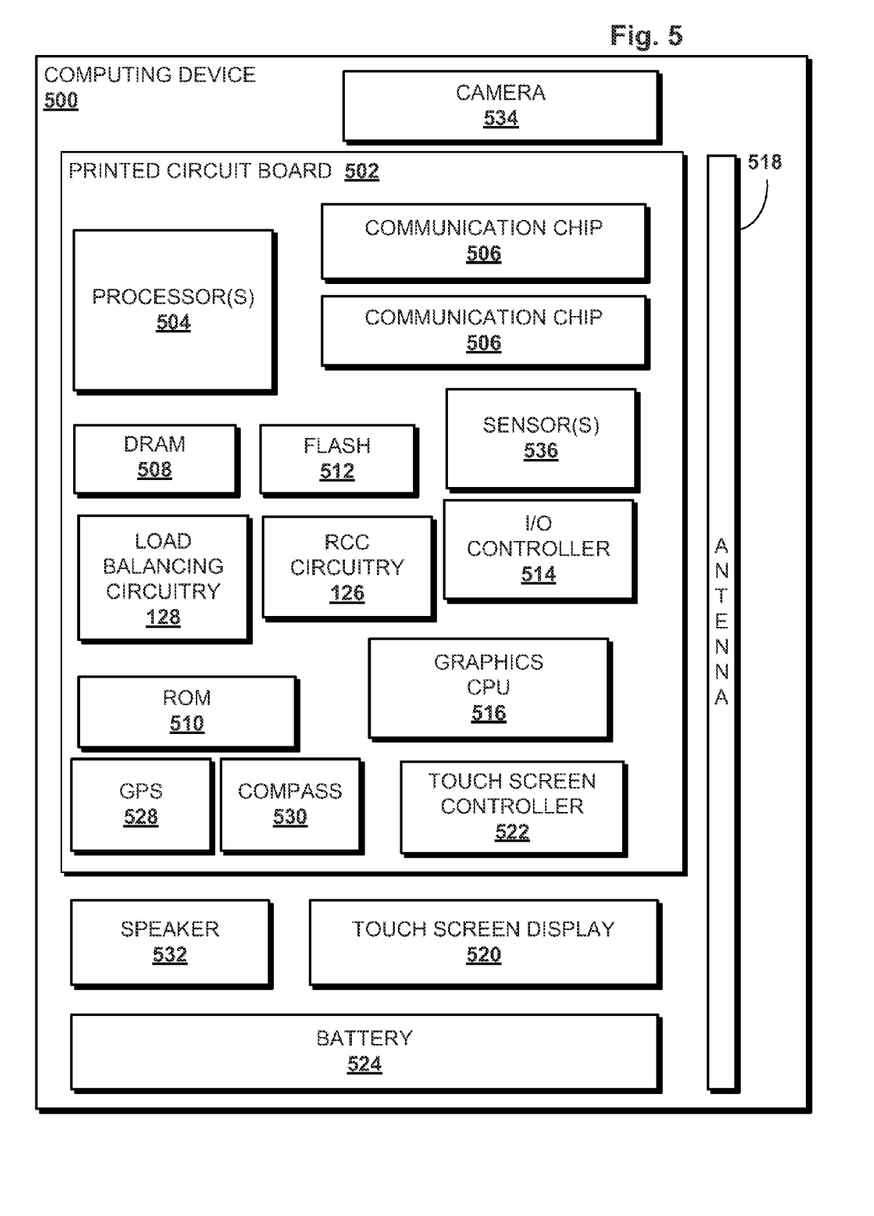
FIG. 5 schematically depicts an example computing device on which disclosed methods and computer-readable media may be implemented, in accordance with various embodiments.

FIG. 5 illustrates an example computing device 500, in accordance with various embodiments. UE 100 or any of the eNBs (e.g., 114-124) described herein may be implemented on a computing device such as computing device 500. Computing device 500 may include a number of components, one or more processor(s) 504 and at least one communication chip 506. In various embodiments, the one or more processor(s) 504 each may be a processor core. In various embodiments, the at least one communication chip 506 may also be physically and electrically coupled to the one or more processors 504. In further implementations, the communication chip 506 may be part of the one or more processors 504. In various embodiments, computing device 500 may include printed circuit board ("PCB") 502. For these embodiments, the one or more processors 504 and communication chip 506 may be disposed thereon. In alternate embodiments, the various components may be coupled without the employment of PCB 502.

Depending on its applications, computing device 500 may include other components that may or may not be physically and electrically coupled to the PCB 502. These other components include, but are not limited to, volatile memory (e.g., dynamic random access memory 508, also referred to as "DRAM"), non-volatile memory (e.g., read only memory 510, also referred to as "ROM"), flash memory 512, an input/output controller 514, a digital signal processor (not shown), a crypto processor (not shown), a graphics processor 516, one or more antenna 518, a display (not shown), a touch screen display 520, a touch screen controller 522, a battery 524, an audio codec (not shown), a video codec (not shown), a global positioning system ("GPS") device 528, a compass 530, an accelerometer (not shown), a gyroscope (not shown), a speaker 532, a camera 534, one or more other sensors 536 (e.g., a barometer, Geiger counter, thermometer, viscometers, rheometers, altimeters, or other sensors), or more a mass storage device (such as hard disk drive, a solid state drive, compact disk ("CD"), digital versatile disk ("DVD"))(not shown), and so forth. In various embodiments, the processor 504 may be integrated on the same die with other components to form a System on Chip ("SoC").

In various embodiments, volatile memory (e.g., DRAM 508), non-volatile memory (e.g., ROM 510), flash memory 512, and the mass storage device may include programming instructions configured to enable computing device 500, in response to execution by one or more processors 504, to practice all or selected aspects of the methods depicted in FIGS. 3 and 4, depending on what computing device 500 is used to implement. More specifically, one or more of the memory components such as volatile memory (e.g., DRAM 508), non-volatile memory (e.g., ROM 510), flash memory 512, and the mass storage device may include temporal and/or persistent copies of instructions that, when executed, by one or more processors 504, enable computing device 500 to operate RRC circuitry 126 and/or load balancing circuitry 128 configured to practice all or selected aspects of methods 300 or 400, depending on what computing device 500 is used to implement.

The communication chips 506 may enable wired and/or wireless communications for the transfer of data to and from the computing device 500. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 506 may implement any of a number of wireless standards or protocols, including but not limited to IEEE 502.20, GPRS, Ev-DO, HSPA+, HSDPA+, HSUPA+, GSM, EDGE, CDMA, DECT, Bluetooth, derivatives thereof, as well as any other wireless protocols that are designated as 3G, 4G, 5G, and beyond. The computing device 500 may include a plurality of communication chips 506. For instance, a first communication chip 506 may be dedicated to shorter range wireless communications such as Wi-Fi and Bluetooth and a second communication chip 506 may be dedicated to longer range wireless communications such as GPS, EDGE, GPRS, CDMA, WiMAX, LTE, Ev-DO, and others.

In various implementations, the computing device 500 may be a mobile device such as a laptop, a netbook, a notebook, an ultrabook, a smart phone, a computing tablet, a personal digital assistant ("PDA"), an ultra mobile PC, a mobile phone, a digital camera, a portable music player, or a stationary device such as a desktop computer, a server, a printer, a scanner, a monitor, a set-top box, an entertainment control unit (e.g., a gaming console), or a digital video recorder. In further implementations, the computing device 500 may be any other electronic device that processes data.

Disclosed techniques may be incorporated into a wide range of devices, e.g., UE, to potentially enhance their functionality/performance. For example, when incorporated into a UE, the UE, during a cell reselection process, may reselect the wireless cell randomly or based on a load of the wireless cell, rather than selecting the wireless cell with the highest $Srxlev_{nonServingCell,x}$.

Although certain embodiments have been illustrated and described herein for purposes of description, this application is intended to cover any adaptations or variations of the embodiments discussed herein. Therefore, it is manifestly intended that embodiments described herein be limited only by the claims.

EXAMPLES

Example 1 includes a UE comprising: RRC circuitry to transition the UE from an RRC idle mode to an RRC connected mode; and load balancing circuitry coupled to the RRC circuitry to: measure signals of a first plurality of cells contemporaneously with the transition of the UE from the RRC idle mode to the RRC connected mode; identify, from within the first plurality of cells, a second plurality of cells having measured signals that satisfy a channel condition criterion and frequency priorities that satisfy a priority criterion; and select and join a cell of the second plurality of cells.

Example 2 includes the UE of Example 1, wherein the load balancing circuitry is to select the cell from the second plurality of cells based on an instruction received via network signaling.

Example 3 includes the UE of Example 2, wherein the load balancing circuitry is to select the cell from the second plurality of cells randomly or based on a load of the cell, responsive to the instruction.

Example 4 includes the UE of Example 2, wherein the instruction comprises a positive integer m, and the load balancing circuitry is further to select the cell from m selected cells of the second plurality of cells.

Example 5 includes the UE of Example 4, wherein the m selected cells are selected from the second plurality of cells based on their channel conditions or loads.

Example 6 includes the UE of any one of Examples 1-5 wherein the load balancing circuitry is further to randomly select the cell from the second plurality of cells.

Example 7 includes the UE of any one of Examples 1-5, wherein the load balancing circuitry is to select the cell from the second plurality of cells based on a load of the cell.

Example 8 includes the UE of any one of Examples 1-5, wherein the channel condition criterion is satisfied by a cell when a measured signal of the cell has a channel condition measurement that exceeds a threshold channel condition measurement.

Example 9 includes the UE of any one of Examples 1-5, wherein the priority criterion is satisfied by a cell when the cell is in a frequency with a priority that is greater than or equal to all other frequency priorities of the first plurality of cells.

Example 10 includes the UE of any one of Examples 1-5, wherein the priority criterion is satisfied by a cell when the cell is in a frequency with a priority that is greater than a threshold frequency priority.

Example 11 includes the UE of any one of Examples 1-5, wherein the load balancing circuitry is to save frequency priorities received via dedicated signaling during an RRC Connection Release.

Example 12 includes the UE of Example 11, wherein the load balancing circuitry is further to selectively join the cell of the second plurality of cells based on the saved frequency priorities.

Example 13 includes a computer-implemented method, comprising: transitioning, by a UE, from an idle mode to a connected mode; measuring, by the UE, signals of a first plurality of cells contemporaneously with the transition of the UE from the idle mode to the connected mode; identifying, by the UE from within the first plurality of cells, a second plurality of cells having measured signals that satisfy a channel condition criterion and frequency priorities that satisfy a priority criterion; and selecting and joining, by the UE, a cell of the second plurality of cells, randomly or based on respective loads of the second plurality of cells.

Example 14 includes the computer-implemented method of Example 13, further comprising: receiving, by the UE via RRC or NAS signaling, an instruction; and selecting, by the UE, the cell from the second plurality of cells based on the instruction.

Example 15 includes the computer-implemented method of Example 14, further comprising selecting, by the UE, the cell from the second plurality of cells randomly or based on a load of the cell, responsive to the instruction.

Example 16 includes the computer-implemented method of Example 14, wherein the instruction comprises a positive integer m, and the method further comprises selecting, by the UE, the cell from m selected cells of the second plurality of cells.

Example 17 includes the computer-implemented method of Example 16, wherein the m selected cells are selected from the second plurality of cells based on their channel conditions or loads.

Example 18 includes the computer-implemented method of any one of Examples 13-17, further comprising randomly selecting, by the UE, the cell from the second plurality of cells.

Example 19 includes the computer-implemented method of any one of Examples 13-17, further comprising selecting, by the UE, the cell from the second plurality of cells based on a load of the cell.

Example 20 includes the computer-implemented method of any one of Examples 13-17, wherein the channel condition criterion is satisfied by a cell when a measured signal of the cell has a channel condition measurement that exceeds a threshold channel condition measurement.

Example 21 includes the computer-implemented method of any one of Examples 13-17, wherein the priority criterion is satisfied by a cell when the cell is in a frequency with priority that is greater than or equal to all other frequency priorities of the first plurality of cells.

Example 22 includes the computer-implemented method of any one of Examples 13-17, wherein the priority criterion is satisfied by a cell when the cell is in a frequency with a priority that is greater than a threshold frequency priority.

Example 23 includes the computer-implemented method of any one of Examples 13-17, further comprising saving frequency priorities received via dedicated signaling during an RRC Connection Release.

Example 24 includes the computer-implemented method of any one of Examples 13-17, further comprising selectively join the cell of the second plurality of cells based on the saved frequency priorities.

Example 25 includes an eNB comprising: one or more processors; memory coupled to the one or more processors; and load balancing circuitry coupled to the processors and memory to: emit a signal to be detected and measured by one or more UE; and broadcast load balancing data, wherein the load balancing data includes frequency priorities and an instruction configured to cause the one or more UE to select and join a wireless cell of a subset of a plurality of detected wireless cells, randomly or based on relative loads of the subset.

Example 26 includes the eNB of Example 25, wherein the load balancing data comprises a load indication of the eNB.

Example 27 includes the eNB of Example 25 or 26, wherein the load balancing circuitry is further configured to obtain one or more load indications from one or more neighboring wireless cells, and the load balancing data includes the one or more load indications from the one or more neighboring cells.

Example 28 includes the eNB of Example 25 or 26, wherein the instruction comprises a positive integer, m, that is configured to cause the one or more UE to select and join the wireless cell from m selected cells of the subset.

Example 29 includes a UE, comprising: means for transitioning the UE from an idle mode to a connected mode; means for measuring signals of a first plurality of cells contemporaneously with the transition of the UE from the idle mode to the connected mode; means for identifying, from within the first plurality of cells, a second plurality of cells having measured signals that satisfy a channel condition criterion and frequency priorities that satisfy a priority criterion; and means for selecting and joining a cell of the second plurality of cells, randomly or based on respective loads of the second plurality of cells.

Example 30 includes the UE of Example 29, further comprising: means for receiving, via RRC or NAS signaling, an instruction; and means for selecting the cell from the second plurality of cells based on the instruction.

Example 31 includes the UE of Example 30, further comprising means for selecting the cell from the second plurality of cells randomly or based on a load of the cell, responsive to the instruction.

Example 32 includes the UE of Example 30, wherein the instruction comprises a positive integer m, and the UE further comprises means for selecting the cell from m selected cells of the second plurality of cells.

Example 33 includes the UE of Example 32, wherein the m selected cells are selected from the second plurality of cells based on their channel conditions or loads.

Example 34 includes the UE of any one of Examples 29-33, further comprising means for randomly selecting the cell from the second plurality of cells.

Example 35 includes the UE of Examples 29-33, further comprising means for selecting the cell from the second plurality of cells based on a load of the cell.

Example 36 includes the UE of any one of Examples 29-33, wherein the channel condition criterion is satisfied by a cell when a measured signal of the cell has a channel condition measurement that exceeds a threshold channel condition measurement.

Example 37 includes the UE of Examples 29-33, wherein the priority criterion is satisfied by a cell when the cell is in a frequency with a priority that is greater than or equal to all other frequency priorities of the first plurality of cells.

Example 38 includes the UE of Examples 29-33, wherein the priority criterion is satisfied by a cell when the cell is in a frequency with a priority that is greater than a threshold frequency priority.

Example 39 includes the UE of any one of Examples 29-33, further comprising means for saving frequency priorities received via dedicated signaling during an RRC Connection Release.

Example 40 includes the UE of any one of Examples 29-33, further comprising means for selectively joining the cell of the second plurality of cells based on the saved frequency priorities.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

What is claimed is:

1. A user equipment ("UE") comprising:
    radio resource control ("RRC") circuitry to transition the UE from an RRC idle mode to an RRC connected mode; and
    load balancing circuitry coupled to the RRC circuitry to:
        measure signals of a first plurality of cells;
        identify, from within the first plurality of cells, a second plurality of cells having measured signals that satisfy a channel condition criterion and priorities that satisfy a priority criterion; and
        select a cell of the second plurality of cells to join.

2. The UE of claim 1, wherein the load balancing circuitry is to select the cell from the second plurality of cells based on an instruction received via network signaling.

3. The UE of claim 2, wherein the load balancing circuitry is to select the cell from the second plurality of cells randomly or based on a load of the cell, responsive to the instruction.

4. The UE of claim 2, wherein the instruction comprises a positive integer m, and the load balancing circuitry is further to select the cell from m selected cells of the second plurality of cells.

5. The UE of claim 4, wherein the m selected cells are selected from the second plurality of cells based on their channel conditions or loads.

6. The UE of claim 1 wherein the load balancing circuitry is further to randomly select the cell from the second plurality of cells.

7. The UE of claim 1, wherein the load balancing circuitry is to select the cell from the second plurality of cells based on a load of the cell.

8. The UE of claim 1, wherein the channel condition criterion is satisfied by a cell when a measured signal of the cell has a channel condition measurement that exceeds a threshold channel condition measurement.

9. The UE of claim 1, wherein the priority criterion is satisfied by a cell when the cell is associated with a priority that is greater than or equal to all other priorities of the first plurality of cells.

10. The UE of claim 1, wherein the priority criterion is satisfied by a cell when the cell is associated with a priority that is greater than a threshold priority.

11. The UE of claim 1, wherein the load balancing circuitry is to save priorities received via dedicated signaling during an RRC Connection Release.

12. The UE of claim 11, wherein the load balancing circuitry is further to selectively join the cell of the second plurality of cells based on the saved priorities.

13. A computer-implemented method, comprising:
    transitioning, by a user equipment ("UE"), from an idle mode to a connected mode;
    measuring, by the UE, signals of a first plurality of cells
    identifying, by the UE from within the first plurality of cells, a second plurality of cells having measured signals that satisfy a channel condition criterion and priorities that satisfy a priority criterion; and
    selecting, by the UE, a cell of the second plurality of cells to join, randomly or based on respective loads of the second plurality of cells.

14. The computer-implemented method of claim 13, further comprising:
    receiving, by the UE via radio resource control ("RRC") or non-access stratum ("NAS") signaling, an instruction; and
    selecting, by the UE, the cell from the second plurality of cells based on the instruction.

15. The computer-implemented method of claim 14, further comprising selecting, by the UE, the cell from the second plurality of cells randomly or based on a load of the cell, responsive to the instruction.

16. The computer-implemented method of claim 14, wherein the instruction comprises a positive integer m, and the method further comprises selecting, by the UE, the cell from m selected cells of the second plurality of cells.

17. The computer-implemented method of claim 16, wherein the m selected cells are selected from the second plurality of cells based on their channel conditions or loads.

18. The computer-implemented method of claim 13, further comprising randomly selecting, by the UE, the cell from the second plurality of cells.

19. The computer-implemented method of claim 13, further comprising selecting, by the UE, the cell from the second plurality of cells based on a load of the cell.

20. The computer-implemented method of claim 13, further comprising saving priorities received via dedicated signaling during an RRC Connection Release.

21. The computer-implemented method of claim 13, further comprising selectively joining the cell of the second plurality of cells based on the saved priorities.

* * * * *

UNITED STATES PATENT AND TRADEMARK OFFICE
CERTIFICATE OF CORRECTION

PATENT NO. : 8,923,880 B2
APPLICATION NO. : 13/802491
DATED : December 30, 2014
INVENTOR(S) : Candy Yiu Page 1 of 1

It is certified that error appears in the above-identified patent and that said Letters Patent is hereby corrected as shown below:

In the claims

Column 12

Line 39, "...cells, ..." should read --...cells; ...--.

Signed and Sealed this
Fourteenth Day of June, 2016

Michelle K. Lee
*Director of the United States Patent and Trademark Office*